United States Patent [19]

Ikemoto et al.

[11] Patent Number: 5,134,335
[45] Date of Patent: Jul. 28, 1992

[54] LINEAR ACTUATOR

[75] Inventors: Yoshihiro Ikemoto, Katano; Jiro Kataoka, Kawanishi, both of Japan

[73] Assignee: Matsushita Electric Industrial Co., Ltd., Kadoma, Japan

[21] Appl. No.: 602,923

[22] Filed: Oct. 23, 1990

Related U.S. Application Data

[63] Continuation of Ser. No. 274,773, Nov. 23, 1988, abandoned.

[30] Foreign Application Priority Data

Nov. 25, 1987 [JP] Japan .................. 62-298363
Nov. 25, 1987 [JP] Japan .................. 62-298364

[51] Int. Cl.$^5$ .................................. H01L 41/08
[52] U.S. Cl. .................................. 310/328; 310/323
[58] Field of Search .................. 310/323, 328

[56] References Cited

U.S. PATENT DOCUMENTS 3,608,409  9/1971  Schmidt .................. 310/328 X

FOREIGN PATENT DOCUMENTS

| 0082286 | 7/1978 | Japan | 310/328 |
| 0115195 | 10/1978 | Japan | 310/328 |
| 0115196 | 10/1978 | Japan | 310/328 |
| 0002691 | 1/1979 | Japan | 310/328 |
| 0177155 | 8/1986 | Japan | 310/328 |
| 430459 | 10/1974 | U.S.S.R. | 310/332 |
| 1453978 | 10/1976 | United Kingdom | 310/328 |

Primary Examiner—Mark O. Budd
Attorney, Agent, or Firm—Cushman, Darby & Cushman

[57] ABSTRACT

A linear actuator has at least one driving unit having a piezoelectric device (11), a yoke (19) fixed on the piezoelectric device (11) and an electromagnet (20, 21) provided on the yoke (19) and a moving member (23) made of magnetic material such as ferrite disposed under the electromagnet (20, 21) with a small gap therebetween; and linear movement of the moving member is produced by repeating expansion and subsequent contraction of the piezoelectric device (11) and simultaneously exciting and subsequent demagnetizing of the electromagnet (20, 21).

7 Claims, 14 Drawing Sheets

LINEAR ACTUATOR

This is a continuation of application Ser. No. 07/274,773, filed Nov. 23, 1988, which was abandoned upon the filing hereof.

FIELD OF THE INVENTION AND RELATED ART STATEMENT

1. FIELD OF THE INVENTION

The present invention relates to a linear actuator for use e.g. in semiconductor manufacturing equipment, and especially relates to a linear actuator for outputting minute displacement to serve as a driving source of a precision stage for precise positioning and the like.

2. DESCRIPTION OF THE RELATED ART

Because motion of a linear actuator is linear, the linear movement can be outputted directly as the driving force for linearly moving an object. Thereby, recently the linear actuator is used in many industrial fields.

As a linear actuator, a linear motor, a linear stepping motor, a piezoelectric ceramic actuator and the like are utilized. For driving an object to be driven in minute displacement or for precisely positioning the object, a laminated piezoelectric ceramic actuator is especially suitable and used in many cases.

A conventional laminated piezoelectric ceramic linear actuator is described in the following referring to FIG. 14 and FIG. 15.

Figure 14:
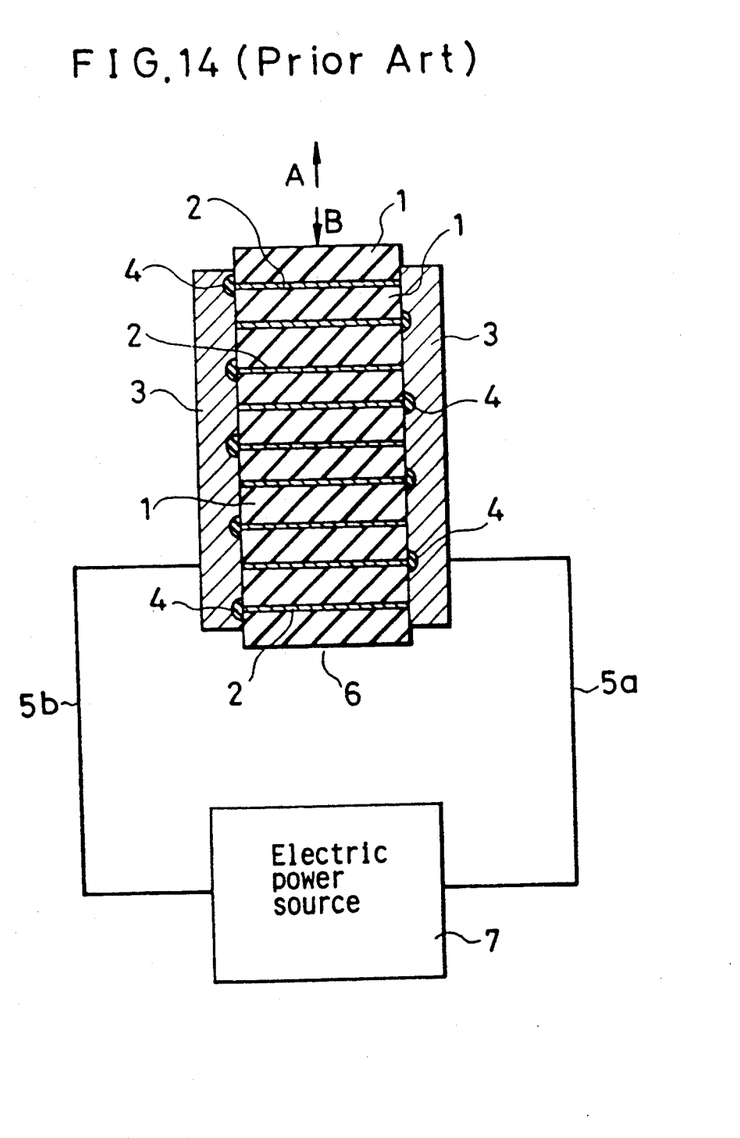
FIG. 14 is a cross-sectional plan view showing a laminated piezoelectric ceramic actuator as a conventional linear actuator.

In FIG. 14, numerals 1,1 . . . designate piezoelectric ceramic sheets made of sintered ceramic green sheets, and metal electrodes 2,2 . . . are printed on surfaces of the piezoelectric ceramic sheets 1,1 . . . and serve as inside electrodes. Outside electrodes 3,3 are alternately connected to the neighboring inside electrodes 2,2 . . . . Numerals 4,4 . . . designate insulating members for insulating respective inside electrodes 2,2 . . . from one (e.g. left side or right side) of the outside electrodes 3,3 which is not connected to the inside electrodes 2,2 . . . . Electric cables 5a and 5b drawn from the respective outside electrodes 3,3 are connected to an electric power source 7. The electric power source 7 supplies an electric voltage for expanding and contracting the laminated piezoelectric ceramics actuator 6 made by lamination and subsequent firing of the piezoelectric ceramic sheets 1,1 . . . .

Motion of the above-mentioned conventional laminated piezoelectric ceramics actuator is described.

When a voltage is applied to the outside electrodes 3,3 from the electric power source 7, the voltage is impressed on the inside electrodes 2,2 . . . printed on the surface of the piezoelectric ceramic sheets 1,1 . . . . At this time, an unidirectional voltage is applied to each piezoelectric ceramic sheets 1,1 . . . , and unidirectional strains are generated in each piezoelectric ceramic sheets 1,1 . . . by electrostriction effect. Total quantity of the strain of the laminated piezoelectric ceramic actuator 6 is in proportion to the number of the laminated piezoelectric ceramic sheets 1,1 . . . and the strain of the laminated piezoelectric ceramic actuator 6 can be linearly taken out as a displacement in a direction shown by arrow A.

When a voltage having the opposite direction to the above-mentioned one is applied from the electric power source 7 to the outside electrodes 3,3 of the laminated piezoelectric ceramic actuator 6, the laminated piezoelectric ceramic actuator 6 contracts in the opposite direction shown by arrow B.

Figure 15:
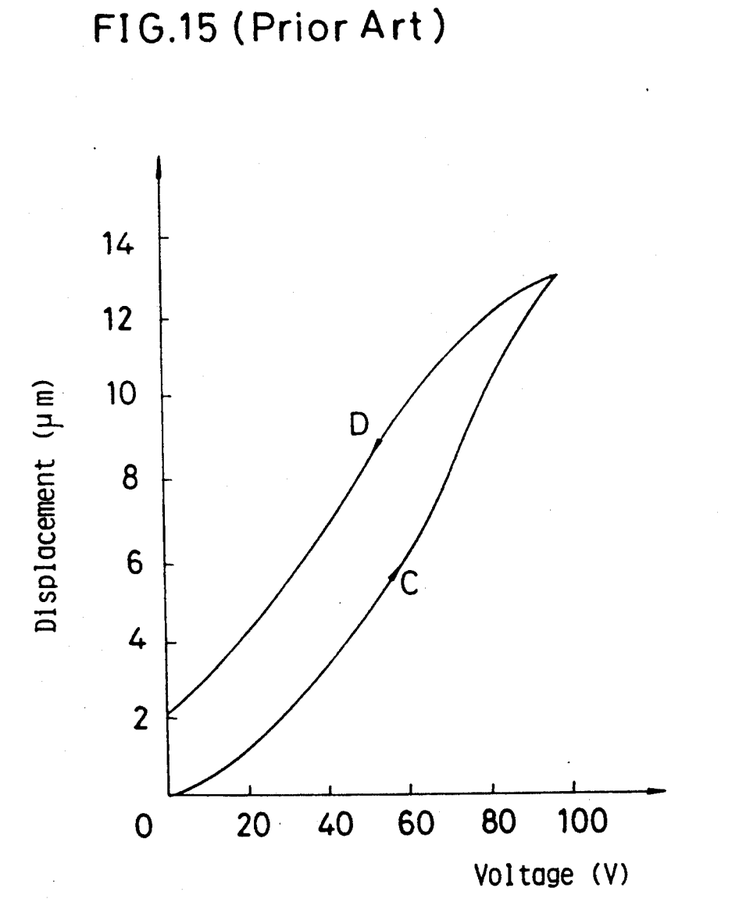
FIG. 15 is a diagram showing relation between displacement of the laminated piezoelectric ceramic actuator and voltage applied thereto.

FIG. 15 is a characteristic curve showing a relation between the displacement of the laminated piezoelectric ceramic actuator 6 and the voltage applied thereto, wherein the total length of the laminated piezoelectric ceramic sheets is 18 mm and the area thereof is 25 mm$^2$, and the maximum voltage to be applied thereto is 100 V. Ordinate of FIG. 15 designates value of the displacement of the laminated piezoelectric ceramic actuator 6 and abscissa of FIG. 15 designates value of the voltage applied by the electric driving power source 7.

In FIG. 15, a characteristic curve C shows change of displacement of the laminated piezoelectric ceramic actuator 6 during the while the voltage applied thereto is gradually increased and the other characteristic curve D shows change of displacement of the laminated piezoelectric ceramic actuator 6 during the while the voltage applied thereto is gradually decreased.

The above-mentioned conventional laminated piezoelectric ceramic actuator 6 has a disadvantage that the displacement or quantity of the expansion and the contraction thereof is very small per the voltage applied thereto by the electric power source 7. Therefore, it is necessary to increase the voltage to be applied to the laminated piezoelectric ceramic actuator 6 or to increase the number of laminated piezoelectric ceramic sheets 1,1 . . . to expand the displacement of the laminated piezoelectric ceramic actuator 6. As a result, the conventional laminated piezoelectric ceramic actuator 6 also has disadvantages that the electric power source 7 becomes large, the size of the laminated piezoelectric ceramic actuator 6 also becomes large and the cost thereof becomes expensive.

OBJECT AND SUMMARY OF THE INVENTION

Object of the present invention is to improve the above-mentioned disadvantages, and especially to provide an improved linear actuator for outputting a large displacement by adding of linear minute displacements continuously and unidirectionally.

A linear actuator in accordance with the present invention comprises:
- a piezoelectric device for outputting mechanical minute displacement by alternation of expanding and contracting thereof;
- a yoke having at least a magnetic tooth and provided on the piezoelectric device;
- a coil wound around the magnetic tooth;
- a first electric power source for supplying an electric voltage intermittedly to the piezoelectric device;
- a second electric power source for supplying an electric current to the coil in synchronism with the supplying of the electric vpltage for generating magnetic flux; and
- a rod-shaped or sheet-shaped magnetic driven member provided facing the magnetic tooth to be attracted by the magnetic flux.

With the above-mentioned combination, minute displacement by expanding and contracting of the piezoelectric device is transmitted to the yoke having the magnetic tooth, which is fixed on the piezoelectric ceramic member. The coil wound around the magnetic teeth serves as an electromagnet by being supplied with an electric current from the second electric power source. The magnetic member is provided facing the magnetic tooth and its movement is restricted by attracting of the electromagnetic flux of the electromagnet. Finally, the displacement of the piezoelectric ceramic member is transmitted to the magnetic member.

In use, the coil can be excited only when the piezoelectric device is expanded and is not excited when the piezoelectric device is contracted. Thereby, the magnetic member continuously moves at steps of minute displacement in the same direction as that of the expansion of the piezoelectric device. On the other contrary, the coil may be excited only when the piezoelectric device is contracted and not excited when the piezoelectric device is expanded. Thereby, the magnetic member continuously moves at steps of minute displacement in the same direction as that of the contraction of the piezoelectric device.

As a result, linear and minute displacement is continuously and unidirectionally taken out from the linear actuator as motion thereof.

In the above-mentioned linear actuator in accordance with the present invention, the piezoelectric device, the yoke, the coil and the first and second electric power sources constitute a driving unit. It is more effective to use two or more sets of the driving units, and to provide the magnetic member of rod-shape or sheet shape for facing the magnetic tooth of the yokes.

In the above-mentioned combination, when the piezoelectric device of one of the driving unit is expanded and the coil thereof is also excited, the piezoelectric device of another driving unit may be contracted and the coil thereof is not excited. Thereby, the magnetic member is driven in a direction corresponding to the expanding direction of the piezoelectric devices at steps of the displacement of the expansion of the respective piezoelectric devices. By repeating the above-mentioned motion, the magnetic member is continuously moved in the expanding direction of the piezoelectric devices.

On the contrary, the coils may be excited only when the corresponding piezoelectric devices of respective driving units are contracted and may not be excited when the corresponding piezoelectric devices of respective driving units are expanded. In that case, the magnetic member continuously moves at steps of minute displacement in the contracting direction of the piezoelectric devices.

When the piezoelectric device of one driving unit is contracted and the coil thereof is also excited, the piezoelectric device of another driving unit may be expanded but the coil thereof not excited. Thereby, the magnetic member is driven in the same direction as the contracting direction of the piezoelectric device at steps of the minute displacement of the contraction of respective piezoelectric devices. By repeating the above-mentioned motion, the magnetic member is continuously moved in the contracting direction of the piezoelectric devices. Accordingly, linear and minute displacement is continuously and unidirectionally taken out as an output from such a linear actuator.

Furthermore, at least one coil wound around the magnetic teeth is always excited for serving as an electromagnet and the magnetic member is always attracted and held by the electromagnet. Therefore, even when the linear actuator receives a mechanical shock from outside the relative position of the magnetic member to the driving units does not change.

DESCRIPTION OF THE PREFERRED EMBODIMENTS

A preferred embodiment of a linear actuator in accordance with the present invention is described in the following referring to FIG. 1, FIG. 1(A), FIG. 2, FIG. 3, FIG. 4, FIG. 5 and FIG. 6.

Figure 1:
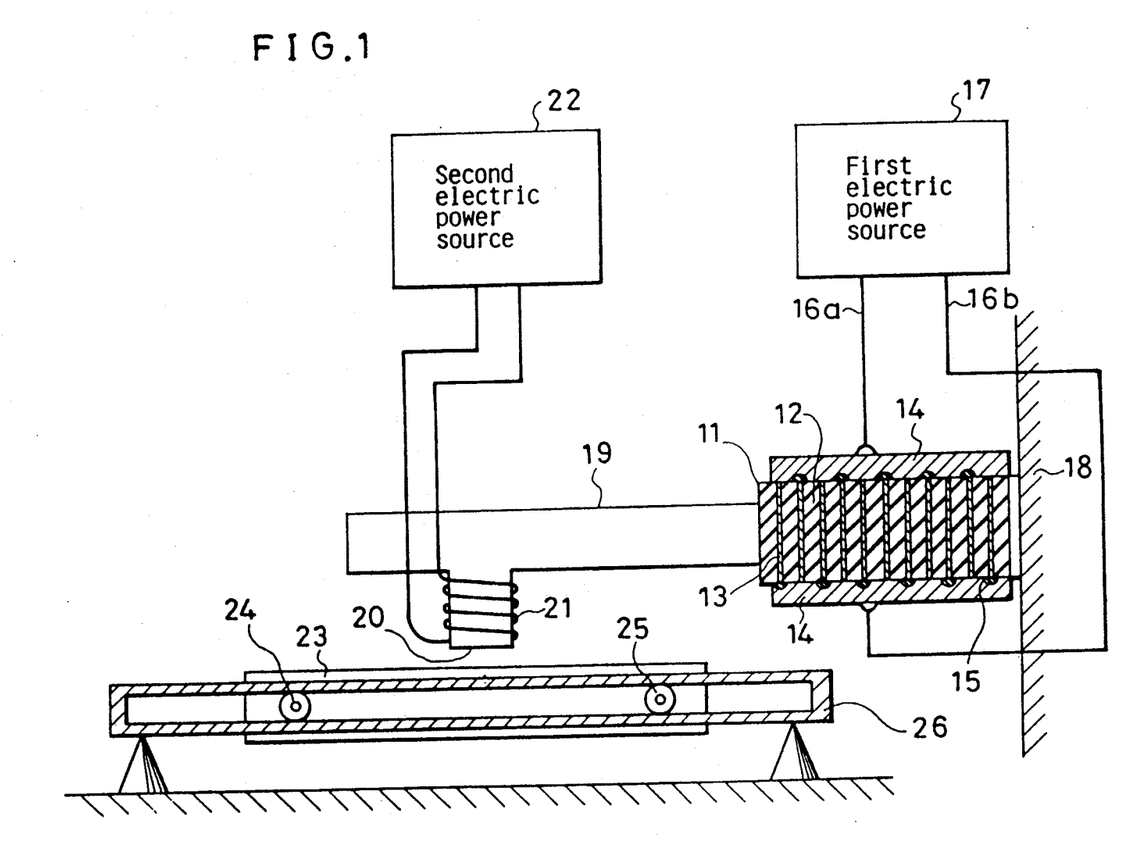
FIG. 1 is a partially sectional side view showing a constitution of a preferred embodiment a linear actuator in accordance with the present invention.
Figure 1A:
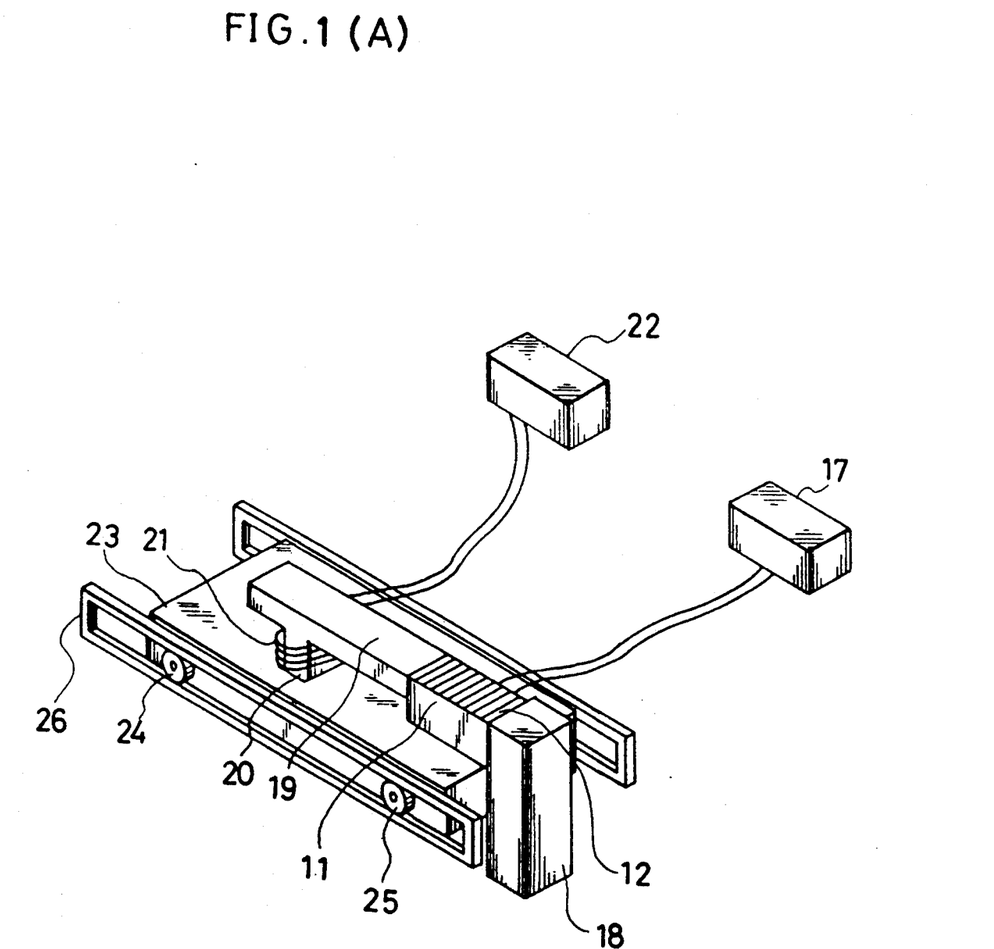
FIG. 1(A) is a perspective view of the linear actuator shown in FIG. 1.

FIG. 1 is a partially sectional side view showing a preferred embodiment of a linear actuator in accordance with the present invention. And FIG. 1(A) is a perspective view showing the linear actuator shown in FIG. 1. In FIG. 1, numeral 11 designates a piezoelectric device. The piezoelectric device (in this embodiment the piezoelectric device 11 consists of, hence is called as laminated piezoelectric ceramic actuator) 11 is made of laminated plural green sheets of piezoelectric ceramic 12. Inside electrodes 13 of metal are printed on surfaces of respective sheets of the piezoelectric ceramic 12. Outside electrodes 14 are electrically connected to the inside electrodes 13. Insulative members 15 are provided between the inside electrodes 13 and the outside electrodes 14 for insulating one outside electrode 14 and alternating inside electrodes 13. Electric cables 16a and 16b are drawn from respective outside electrodes 14 and connected to a first electric power source 17 which supplies electric voltage for expanding and contracting the laminated piezoelectric ceramic actuator 11. One end of the laminated piezoelectric ceramic actuator 11 is fixed on a fixed member 18. A rod-shaped yoke 19 having a magnetic tooth 20 is fixed on the other end of the laminated piezoelectric ceramic actuator 11. A coil 21 is wound in multi-turns around the magnetic tooth 20 of the rod-shaped yoke 19. The coil 21 is electrically connected to a second electric power source 22. A rod-shaped or sheet-shaped magnetic member 23 made of ferrite is provided facing the magnetic tooth 20 of the rod-shaped yoke 19 with a predetermined gap, for example, 0.5 mm. Rollers 24 and 25 are provided on side face of the magnetic member 23 and slides on a guide 26.

Motion of the above-mentioned linear actuator is described in the following referring to FIGS. 2 to 5.

Figure 2:
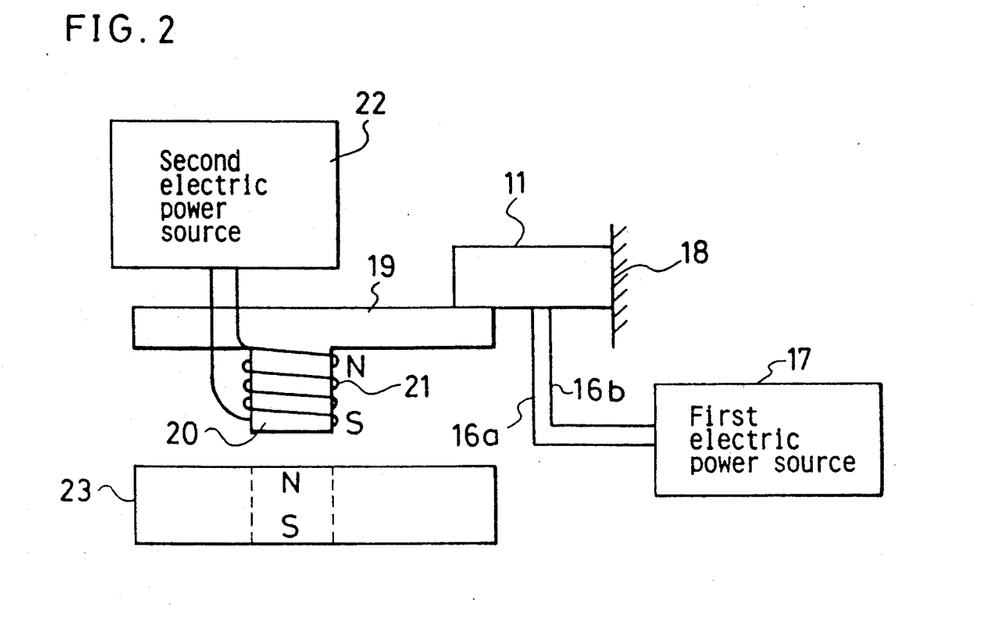
FIG. 2, FIG. 3, FIG. 4 and FIG. 5 are respectively side views showing first, second, third and fourth steps of the linear actuator shown in FIG. 1.
Figure 3:
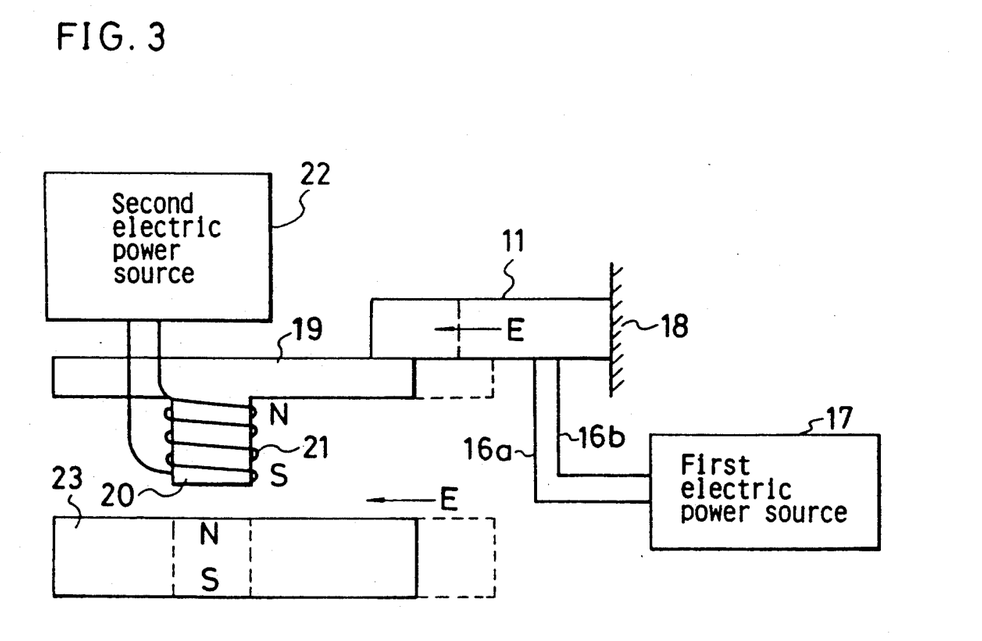

FIG. 2 shows a first step of the motion of the linear actuator. First, when an electric current is supplied to the coil 21 by the second electric power source 22, S-pole and N-pole are produced in the magnetic tooth 20, and thereby the coil 21 and the magnetic tooth 20 work as an electromagnet. When a pole, for example, S-pole is produced on an open end of the tooth 20 facing to the magnetic member 23, the opposite pole thereto, namely, N-pole is produced on a surface of the magnetic member 23 facing to the tooth 20. Thereby, attracting of electromagnetic flux is generated between the magnetic member 23 and the magnetic tooth 20. At this time, the laminated piezoelectric ceramic actuator 11 is at a home (resting) position because no electric voltage is applied thereto by the first electric power source 17, which is switched off:

FIG. 3 shows a second step of the motion of the linear actuator. When the first electric power source 17 turns on to supply an electric voltage to the laminated piezoelectric ceramic actuator 11, the laminated piezoelectric ceramic actuator 11 is expanded in a direction shown by arrow E such that the direction of movement corresponds to the lamination direction of the laminated ceramics. At this time, the magnetic member 23 is held by attraction to the magnetic tooth 20 by the electromagnetic flux therebetween. So that, when the rod shaped yoke 19 is moved by the strain of the laminated piezoelectric ceramic actuator 11, the magnetic member 23 is also moved by the same distance, following the movement of the magnetic tooth 20 of the rod-shaped yoke 19.

Figure 4:
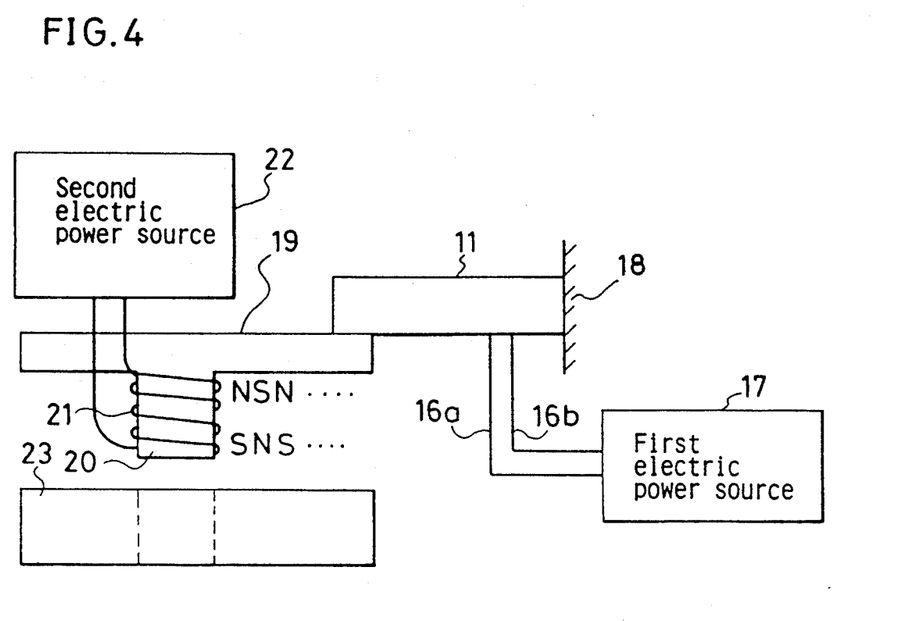

FIG. 4 shows a third step of the motion of the linear actuator. When the movement of the magnetic member 23 in the direction shown by arrow E is completed in the second step shown in FIG. 2, the first electric power source 17 is kept on to further supply the electric voltage to the laminated piezoelectric ceramic actuator 11. At this time, the coil 21 is supplied with an electric current for generating an alternating magnetic field by the second electric power source 22, in a manner that the magnetized parts of the magnetic member 23, wherein N-pole parts and S-pole parts are partially magnetized, are demagnetized.

Figure 5:
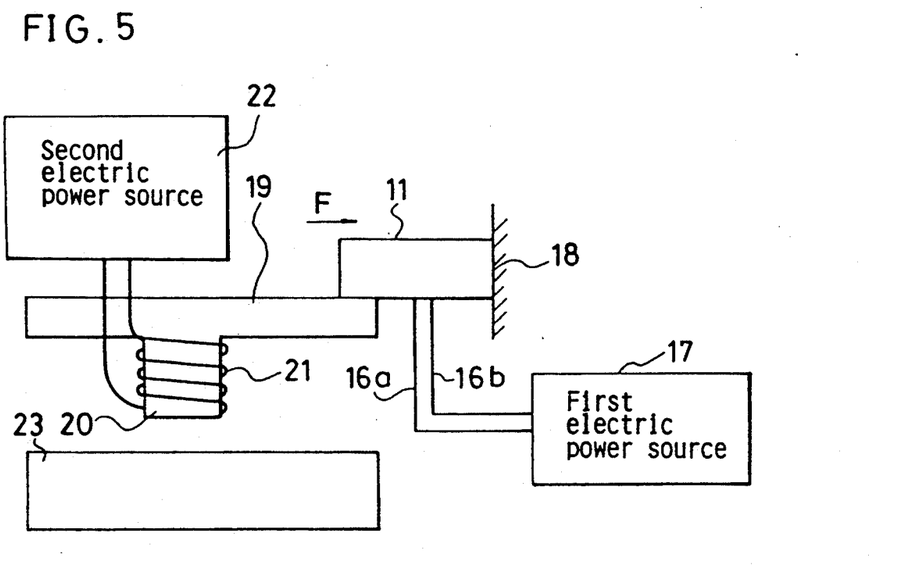

FIG. 5 shows a fourth step of the motion of the linear actuator. The coil 21 is demagnetized by turning off of the second electric power source 22 in the third step shown in FIG. 4. The voltage of the output of the first electric power source 17 is turned off for contracting the laminated piezoelectric ceramic actuator 11. Thereby, the laminated piezoelectric ceramic actuator 11 is contracted in a direction shown by arrow F to the home position shown in the first step.

Figure 6:
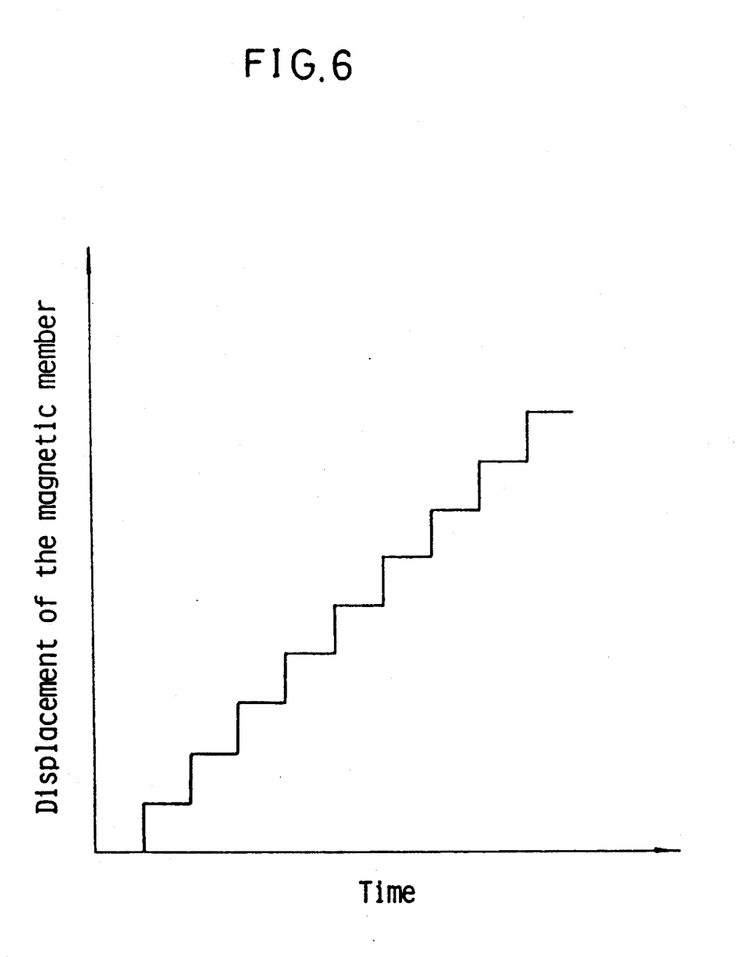
FIG. 6 is a diagram showing a relation between displacement and time of the linear actuator in accordance with the present invention.

After that, by repeating the above-mentioned first, second, third and fourth steps, the magnetic member 23 is moved at steps of minute displacement corresponding to the displacement of the laminated piezoelectric ceramic actuator 11 continuously. Such a motion of the magnetic member 23 is shown in FIG. 6, wherein abscissa of FIG. 6 shows time and ordinate thereof shows the displacement of the magnetic member 23.

An example of moving the magnetic member 23 in the opposite direction corresponding to the contracting direction of the laminated piezoelectric ceramic actuator 11 is also described. At first, the laminated piezoelectric ceramic actuator 11 is expanded by supplying a voltage thereto by turning on of the first electric power source 17. Next, the coil 21 is supplied with an electric current by the second electric power source 22 to work as an electromagnet together with the magnetic tooth 20. Thereby, a part of the magnetic member 23 facing to the magnetic tooth 20 is magnetized. Accordingly, an attracting electromagnetic flux of the coil 21 and the magnetic tooth 20 acts the magnetic member 23. By keeping such a state, when the laminated piezoelectric ceramic actuator 11 is contracted, the magnetic member 23 moves in the contracting direction of the laminated piezoelectric ceramic actuator 11 to follow the motion of the magnetic tooth 20. Furthermore, the coil 21 is supplied to an electric current for generating an alternating magnetic field by the second electric power source 22. After demagnetization of the magnetized part of the magnetic member 23, the laminated piezoelectric ceramic actuator 11 is expanded and the coil 21 is excited again. By repeating the above-mentioned steps, the magnetic member 23 is continuously moved at respective steps of minute displacement in the contracting direction of the laminated piezoelectric ceramic actuator 11.

According to the above-mentioned embodiment of the linear actuator of the present invention, the rod-shaped yoke 19 having the magnetic tooth 20 is fixed on the laminated piezoelectric ceramic actuator 11 and the coil 21 is wound around the magnetic tooth 20. And the coil 21 and the magnetic tooth 20 work as electromagnet by supplying of electric current to attract the magnetic member 23. Thereby, the rod-shaped or sheet-shaped magnetic member 23 is continuously moved at respective steps of minute displacement corresponding to the strain of the laminated piezoelectric ceramic actuator 11 in either direction of expanding or contracting of the laminated piezoelectric ceramic actuator 11.

While the laminated piezoelectric ceramic actuator 11 of the above-mentioned embodiment is made by lamination of the piezoelectric ceramic green sheets, a laminated bi-morph type piezoelectric ceramic actuator can be used in place therefor. And also, one magnetic tooth 20 is formed on the rod-shaped yoke 19, but plurality of the magnetic tooth can be accepted. Furthermore, though ferrite has been selected as a material of the magnetic member 23, another magnetic material can be selected.

Another preferred embodiment of a linear actuator in accordance with the present invention is described in the following referring to FIG. 7, FIG. 8, FIG. 9, FIG. 10, FIG. 11, FIG. 12 and FIG. 13.

Figure 7:
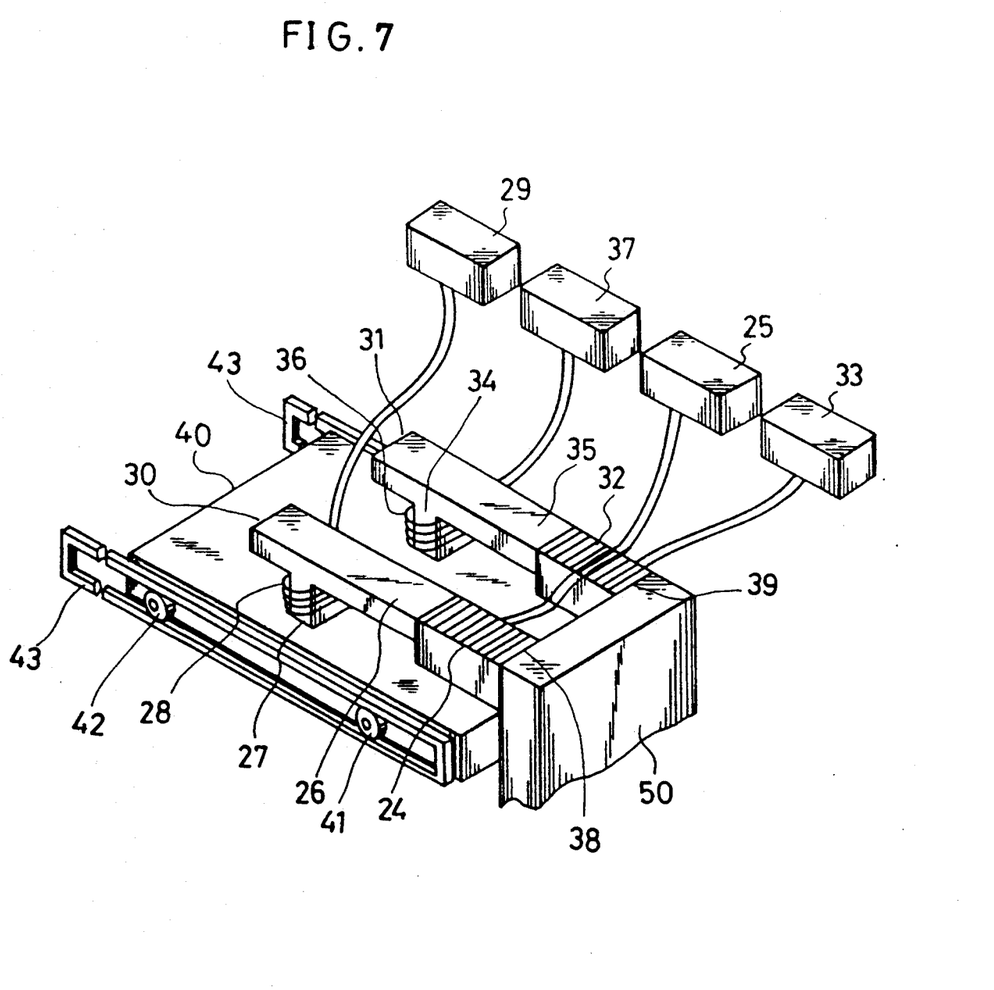
FIG. 7 is a perspective view showing another preferred embodiment of a linear actuator in accordance with the present invention.

FIG. 7 is a perspective view showing another preferred embodiment of a linear actuator in accordance with the present invention. Corresponding parts and components to the first embodiment are shown by the same numerals and marks, and the description thereon made in the first embodiment similarly apply. Differences and features of this second embodiment from the first embodiment are as follows. In FIG. 7, numeral 24 designates a first laminated piezoelectric ceramic actuator made by lamination and sintering of piezoelectric ceramic green sheet. Numeral 25 designates a first electric power source for supplying a voltage output for expanding and contracting the first laminated piezoelectric ceramic actuator 24. A first rod-shaped yoke 26 is fixed on an end of the first laminated piezoelectric ceramic actuator 24 and has a first magnetic teeth 27. A first coil 28 is wound around the first magnetic teeth 27. A second electric power source 29 supplies an electric current to the first coil 28. The elements designated by numerals 24 to 29 constitutes a first driving unit 30.

A second driving unit 31 is constituted as the same as the first driving unit 30. Namely, the second driving unit 30 comprises: a second laminated piezoelectric ceramic actuator 32 made by lamination and sintering of piezoelectric ceramic green sheet; a third electric power source 33 for supplying a voltage output for expanding and contracting the second laminated piezoelectric ceramic actuator 32; a second rod-shaped yoke 35 fixed on an end of the second laminated piezoelectric ceramic actuator 32 and having a second magnetic teeth 34; a second coil 36 wound around the second magnetic teeth 34; and fourth electric power source 37 supplying an electric current to the second coil 36.

The first and second laminated piezoelectric ceramic actuators 24 and 32 are respectively fixed parallelly each other on the fixed member 50 at ends 38 and 39 thereof. A rod-shaped or sheet-shaped magnetic member 40 which is made of ferrite is disposed facing the first and second magnetic tooth 27 and 34 of the first and second rod-shaped yokes 26 and 35. Rollers 41 and 42 are provided on side face of the magnetic member 40 and roll on a guide 43 when the magnetic member 40 moves. The rollers 41 and 42 are guided on top and bottom of them by the guide 43 so as not to be attracted by the magnetic member 40 when the first or second coil 28 or 36 is excited for serving as an electromagnet by being supplied an electric current.

Motion of the above-mentioned linear actuator is described referring to FIGS. 8 to 13.

Figure 8:
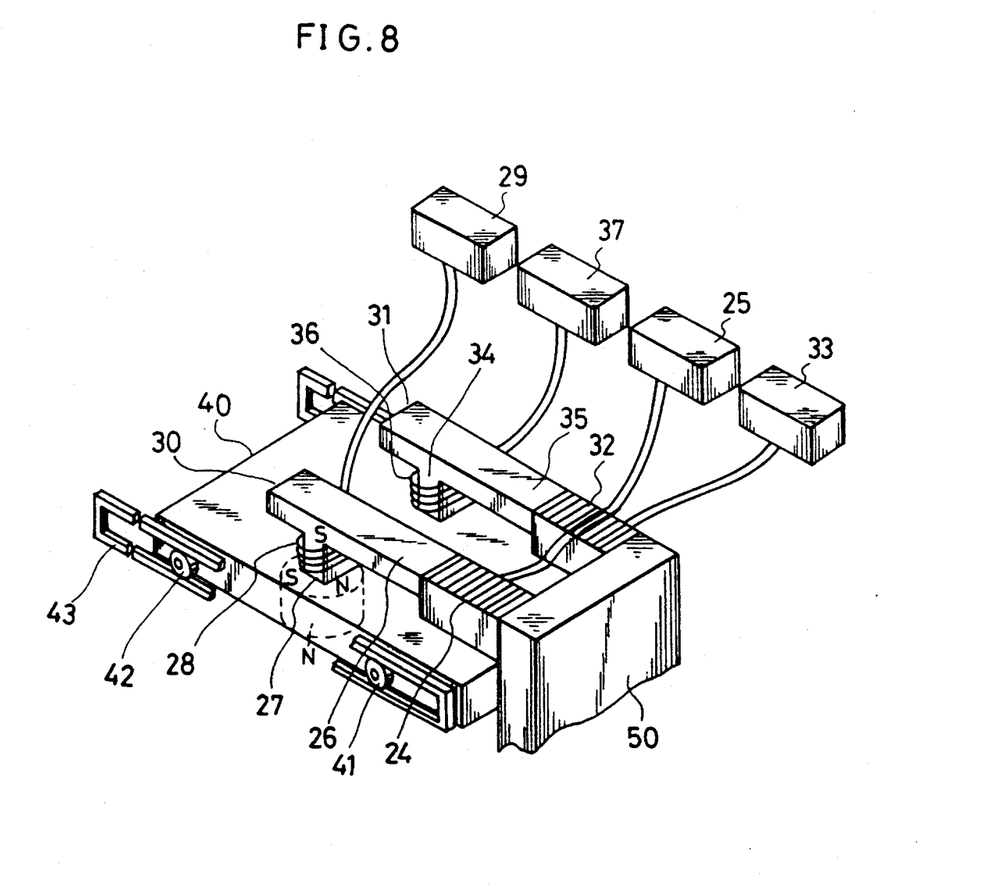
FIG. 8, FIG. 9, FIG. 10, FIG. 11 and FIG. 12 are respectively perspective views showing first, second, third, fourth and fifth steps of the linear actuator shown in FIG. 7.

FIG. 8 shows a first step of the motion of the linear actuator. First, the first and second laminated piezoelectric ceramic actuators 24 and 32 are at home positions because any electric voltage is not applied thereto by the first and third electric power sources 25 and 33 which are switched off. When an electric current is supplied to the first coil 28 by the second electric power source 29, S-pole and N-pole is produced in the magnetic teeth 27 and thereby the first coil 28 and the first magnetic teeth 27 serve as an electromagnet. When a pole, for example, N-pole is produced on an open end of the first magnetic teeth 27 facing to the magnetic member 40, the opposite pole thereto, namely, N-pole is produced on a surface of the magnetic member 40 facing to the first magnetic teeth 27. Thereby, attracting of electromagnetic flux is generated between the first magnetic teeth 27 and the magnetic member 40 to attract the magnetic member 40 to the first magnetic teeth 27.

Figure 9:
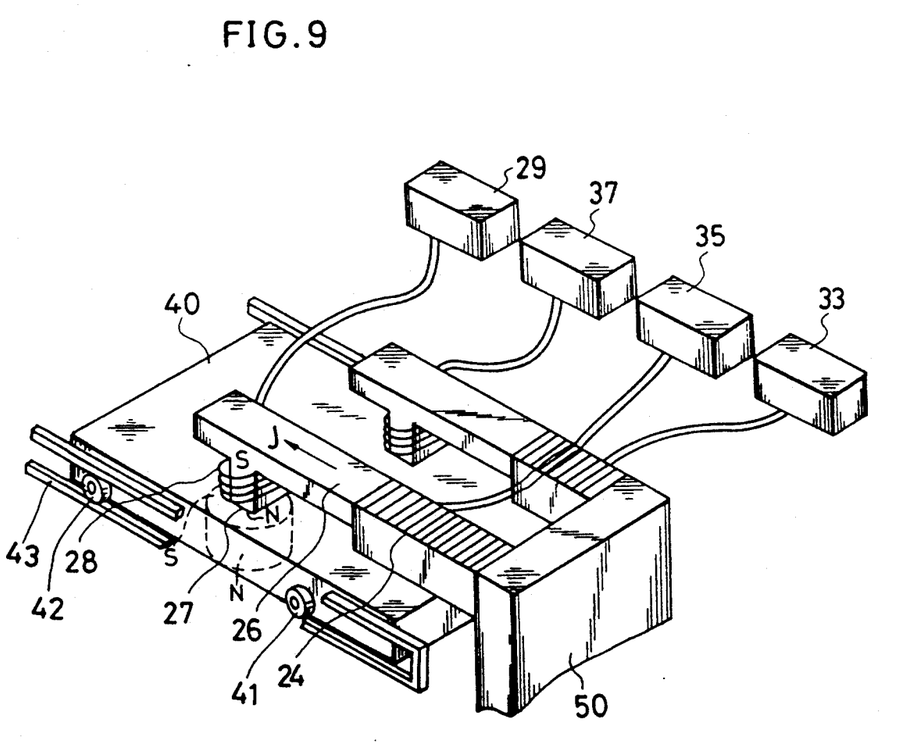

FIG. 9 shows a second step of the motion of the linear actuator. When the first electric power source 25 turns on for supplying an electric voltage to the first laminated piezoelectric ceramic actuator 24 over the first step shown in FIG. 8, the first laminated piezoelectric ceramic actuator 24 is expanded in a direction shown by arrow J. At this time, the magnetic member 40 is held in the state attracted to the first magnetic teeth 27 by the attracting of the electromagnetic flux generated by the first coil 28. Therefore, the first rod shaped yoke 26 is moved by the strain of the first laminated piezoelectric ceramic actuator 24 and the magnetic member 40 is also moved by the same displacement with the following to the displacement of the first magnetic teeth 27.

Figure 10:
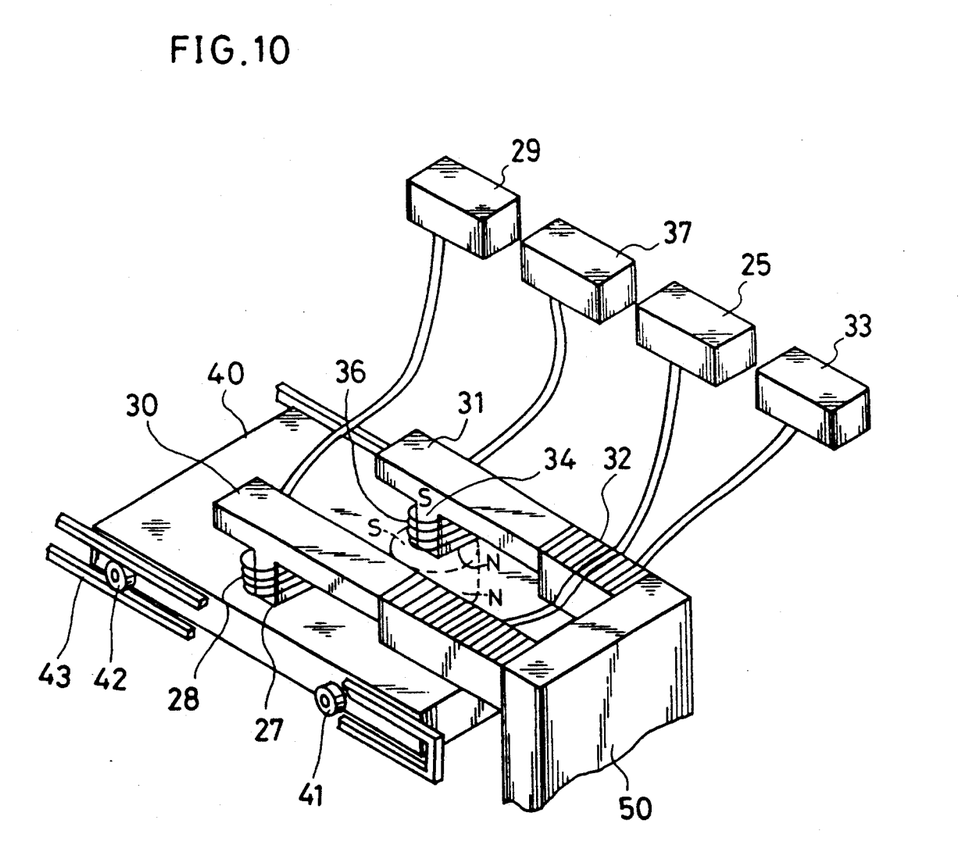

FIG. 10 shows a third step of the motion of the linear actuator. When the movement of the magnetic member 40 in the direction shown by arrow J is completed over the second step shown in FIG. 9, the second coil 36 is supplied with an electric current by the fourth electric power source 37 to work as an electromagnet. Thereby, a pole which is opposite to a pole generated on an open end of the second magnetic teeth 34 is produced on a part of the magnetic member 40 facing to the second magnetic teeth 34. Thereby, attracting of electromagnetic flux is generated between the second magnetic teeth 34 and the magnetic member 40 to attract the magnetic member 40 to the second magnetic teeth 34. At this time, the first coil 28 is supplied with an electric current for generating an alternating magnetic field by the second electric power source 29. As a result, the magnetized part of the magnetic member 40 is demagnetized.

Figure 11:
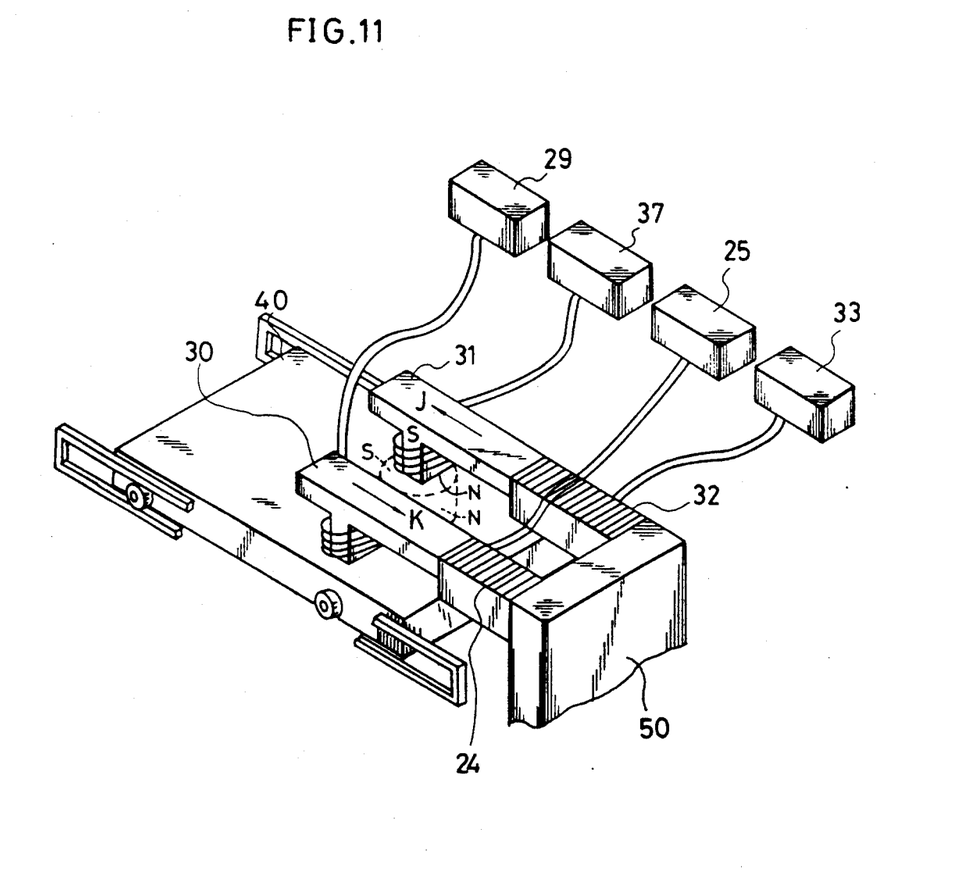

FIG. 11 shows a fourth step of the motion of the linear actuator. The voltage supplied to the first laminated piezoelectric ceramic actuator 24 of the first driving unit 30 is turened off for contracting the first laminated piezoelectric ceramic actuator 24 to the home position. At this time, the second laminated piezoelectric ceramic actuator 32 of the second driving unit 31 is supplied with a voltage by the third electric power source 33 for expanding in the direction shown by arrow J. Thereby, the magnetic member 40 is moved at a displacement corresponding to the displacement of the second laminated piezoelectric ceramic actuator 32.

Figure 12:
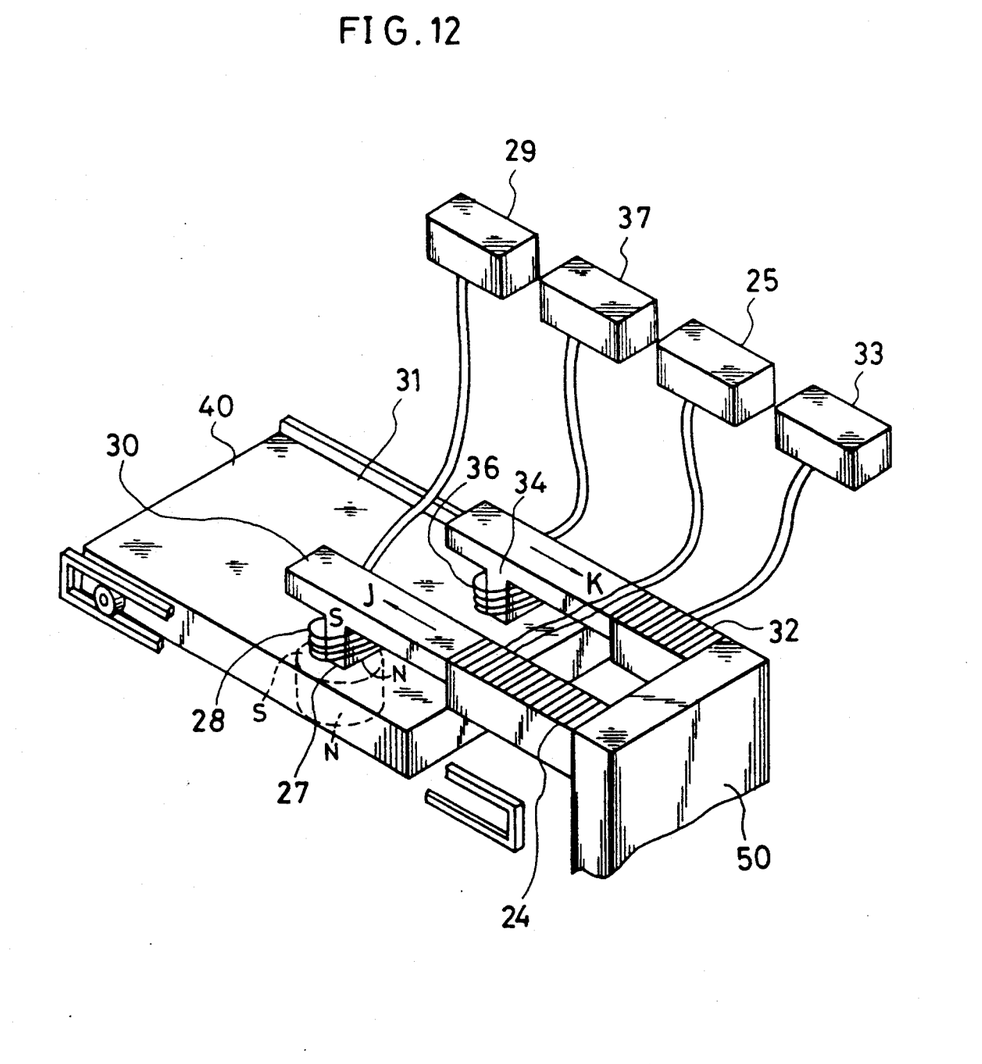

FIG. 12 shows a fifth step of the motion of the linear actuator. After completing the movement of the magnetic member 40, the first coil 28 of the first driving unit 30 is supplied with an electric current by the second electric power source 29 to work as an electromagnet. Thereby, a part of the magnetic member 40 facing to the first magnetic teeth 27 is magnetized to make a magnetic pole opposite to that of the open end of the first magnetic teeth 27. Accordingly, the magnetic member 40 is held attracted by the electromagnetic flux generated between the magnetic member 40 and the first magnetic teeth 27. Furthermore, the second coil 36 of the second driving unit 31 is supplied with A.C. electric current by the fourth electric power source 37 for generating an alternating magnetic field for demagnetizing the magnetized part of the magnetic member 40.

After completing the demagnetization, the voltage supplied to the second laminated piezoelectric ceramic actuator 32 by the third electric power source 33 is turened off for contracting the second laminated piezoelectric ceramic actuator 32. Thereby, the second rod-shaped yoke 35 fixed on the second laminated piezoelectric ceramic actuator 32 is moved in a direction shown by arrow K to the home position. Furthermore, when the first electric power source 25 turns on, the first laminated piezoelectric ceramic actuator 24 returns to the second step shown in FIG. 9. By repeating the above-mentioned motions, the magnetic member 40 is moved in the direction corresponding to the expanding direction of the laminated piezoelectric ceramic actuators 24 and 32 continuously.

Figure 13:
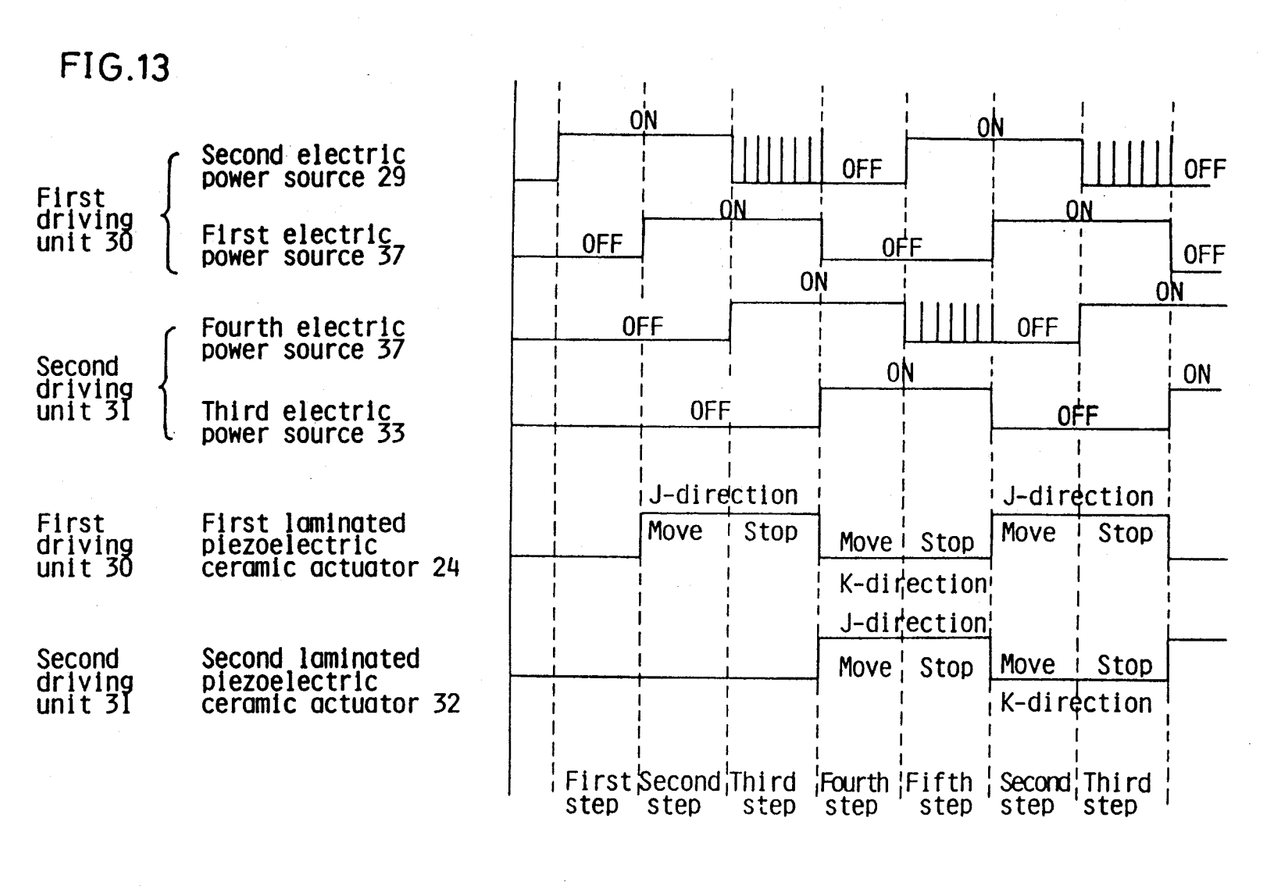
FIG. 13 is a drawing showing the sequences of switching on and off of respective electric power sources shown in FIGS. 7 to 12.

FIG. 13 shows sequences of the switching on and switching off of respective electric power sources 25, 29, 33 and 37.

On the contrary, for moving the moving member 40 in a direction of contracting of the first and second laminated piezoelectric ceramic actuators 24 and 32, the first and second coils 28 and 36 are to be supplied with electric currents for making the first and second magnetic tooth 27 and 34 working as electromagnets under the condition that the first and second laminated piezoelectric ceramic actuators 24 and 32 be expanded. Furthermore, the first and second coils 28 and 36 are respectively supplied with electric currents for generating alternating magnetic fields when the corresponding first and second laminated piezoelectric ceramic actuator 24 or 32 is at the home position.

As above-mentioned second preferred embodiment, two driving units 30 and 31 are provided. Thereby, unidirectional minute displacements of the first and second laminated piezoelectric ceramic actuators 24 and 32 can be outputted as continuous linear movement of the magnetic member 40. And also, the driving speed of the magnetic member 40 is faster than that of the first preferred embodiment wherein one of the corresponding driving unit is provided. Furthermore, as the magnetic member 40 is always held by the attracting of electromagnetic flux from either one of electromagnets of the magnetic tooth 27 and 34 and the coils 28 and 36 in the second preferred embodiment, the magnetic member 40 is not moved by the external vibration or the like.

In the second preferred embodiment, two driving units 30 and 31 are used. However, it is more effective to use three or more driving units. And only one magnetic tooth is provided on respective rod-shaped yokes. However, two or more teeth can be provided on respective rod-shaped yokes. As material of the magnetic member in the foregoing embodiment, ferrite is used. However, other magnetic materials can be used as magnetic member 40. Furthermore, it is needless to say that other guiding mechanisms can be used apart from use of the rollers 41 and 42 in sliding part. The laminated piezoelectric ceramic actuator 24 and 32 which are made by lamination of the piezoelectric ceramic sheet method can be replaced by such as bi-morph type ones.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A linear actuator comprising:

a piezoelectric device for outputting an output of a unit of displacement by expanding and contracting thereof said piezoelectric device comprising a plurality of ceramics laminated in a lamination direction;

a rod-shaped yoke having a magnetic tooth and provided on said piezoelectric device;

a coil wound around said magnetic tooth;

a first electric power source supplying an electric voltage intermittently to said piezoelectric device;

a second electric power source supplying an electric current to said coil in synchronism with said supplying of said electric voltage for generating electromagnetic flux;

a sheet-shaped magnetic driven member having side faces provided facing said magnetic tooth of said rod-shaped yoke which is to be attracted to and held by said magnetic tooth by said electromagnetic flux, thereby being moved in a direction parallel to said lamination direction with displacement of said rod-shaped yoke; and at least two pair of rollers provided on said side faces of said magnetic member.

2. A linear actuator in accordance with claim 1, further comprising:

guide means whereon said rollers roll for guiding movement of said magnetic member in driven direction thereof.

3. A linear actuator comprising: at least two sets of driving units, each unit comprising:

a piezoelectric device for outputting an output of a unit of displacement by expanding and contracting thereof said piezoelectric device comprising a plurality of ceramics laminated in a lamination direction;

a rod-shaped yoke having a magnetic tooth and provided on said piezoelectric device;

a coil wound around said magnetic tooth;

a first electric power source supplying an electric voltage intermittently to said piezoelectric device;

a second electric power source supplying an electric current to said coil in synchronism with said supplying of said electric voltage for generating electromagnetic flux;

a sheet-shaped magnetic member provided facing said magnetic teeth of said rod-shaped yokes which is to be attracted to and held by said electromagnetic flux, thereby being moved in a direction parallel to said lamination direction with displacement of said rod-shaped yokes; and a base to which each of said driving units is attached so that each driving unit moves said magnetic driven member in said direction parallel to said lamination direction and said driving units thereby cooperate to obtain movement of said magnetic driven member.

4. A linear actuator in accordance with claim 3, wherein at least two pairs of rollers are provided on side faces of said magnetic member.

5. A linear actuator in accordance with claim 4, further comprising: guide means whereon said rollers roll for guiding movement of said magnetic member in driven direction thereof.

6. A linear actuator according to claim 3 wherein only one of said two driving units moves said magnetic driven member at any one time, and wherein at least one of said rod shaped yokes from one of said driving units is attracted to said magnetic driven members during operation of said linear actuator to obtain even smoother linear movement.

7. A linear actuator according to claim 4 wherein only one of said two driving units moves said magnetic driven member at any one time, and wherein at least one of said rod shaped yokes from one of said driving units is attracted to said magnetic driven members during operation of said linear actuator to obtain even smoother linear movement.

* * * * *